United States Patent [19]

Pollard

[11] Patent Number: 5,243,417
[45] Date of Patent: Sep. 7, 1993

[54] REAR VISION SYSTEM FOR TWO-WHEELED VEHICLES WITH MOVABLE HANDLEBARS

[75] Inventor: Christopher A. Pollard, Monument, Colo.

[73] Assignee: Sony Corporation, Tokyo, Japan

[21] Appl. No.: 847,603

[22] Filed: Mar. 5, 1992

[51] Int. Cl.$^5$ ............................................... H04N 7/18
[52] U.S. Cl. ...................................... 358/103; 358/108
[58] Field of Search ................. 358/93, 108, 254, 103

[56] References Cited

U.S. PATENT DOCUMENTS

| | | | |
|---|---|---|---|
| 3,689,695 | 9/1972 | Rosenfield | 358/108 |
| 5,027,200 | 6/1991 | Petrossian | 358/108 |
| 5,121,200 | 6/1992 | Choi | 358/108 |

Primary Examiner—Howard W. Britton
Attorney, Agent, or Firm—Philip M. Shaw, Jr.

[57] ABSTRACT

A rear vision system for vehicles, and more particularly to a system for providing a rider of a two-wheeled vehicle having movable handlebars the capability of seeing what is behind the vehicle while still facing forward.

7 Claims, 2 Drawing Sheets

REAR VISION SYSTEM FOR TWO-WHEELED VEHICLES WITH MOVABLE HANDLEBARS

BACKGROUND OF THE INVENTION

1. Field of the Invention

The present invention relates to rear vision systems for vehicles, and more particularly to a system for providing a rider of a two-wheeled vehicle, with movable handlebars, the capability of seeing what is behind the vehicle while still facing forward.

2. Description of the Prior Art

Riders of motorcycles and bicycles are particularly prone to dangers that lie behind them. Because of the narrow profile of these vehicles, they can be nearly invisible from behind to drivers of other vehicles. Therefore, riders must keep careful watch of activity behind them.

Presently, riders of motorcycles and bicycles use rear-view mirrors, mounted either to the handlebars of the vehicle or to the rider's head. However, rear view mirrors do not provide a complete view; they leave blind spots. Also, the rear-view provided by mounted mirrors changes as the handlebars are turned, thereby providing an inconsistent range of view. Similarly, the rear-view provided by mounted mirrors also changes as the position of the rider's head changes. The position of a rider's head has considerable variation. A rider may, for example, lower his upper body to reduce wind resistance or shift his entire body to maintain balance while turning. Furthermore, rear view mirrors attached either to a vehicle's handlebars or to a rider's head often provide a picture blurred by vibration.

Finally, the limited usefulness of the rearview provided by wing mirrors is often outweighed by negative affect of air resistance on the wing mirrors. Side mirrors have been shown to provide significant drag force; typical wing mirror designs have drag coefficients around 1.

Another option for the rider is to physically turn his head and look back at the activity behind him. When the rider turns his head, however, he must divert his attention from what lies ahead. On a two-wheeled vehicle, when a rider turns his head to see what lies behind, it may disrupt the balance of the vehicle and cause it to stray from its straight-ahead path.

For recreational vehicles, trucks, and boats, a lightweight Sony Watchcam System (Model No. YM-RVX2AM) provides a driver a complete view of what lies behind his vehicle. The Watchcam System comprises a lightweight video camera (model HVM-510AM) that can be mounted anywhere on the vehicle and a 4×8×1 inch, flat screen, black-and-white monitor (model FDM-412AM).

What is desired is a rear-vision system for providing a rider of a two-wheeled vehicle, with movable handlebars, a stable rear view.

SUMMARY OF THE INVENTION

Accordingly, the present invention provides a rear vision system comprised of a rear facing camera mounted on the frame of a motorcycle or under the seat of a bicycle, and a monitor attached by cable to the camera and mounted at a convenient place on the motocycle or bicycle.

The foregoing and other objectives, features and advantages of the invention will be more readily understood upon consideration of the following detailed description of certain preferred embodiments of the invention, taken in conjunction with the accompanying drawings.

DESCRIPTION OF THE PREFERRED EMBODIMENTS

The present invention provides a rear vision system comprised of a rear facing camera on or about the frame of a two-wheeled vehicle, and a monitor or other viewing device attached by cable to the camera and mounted at a convenient place on the vehicle. The monitor can be mounted on the frame, on the handlebars, or at any other position that is easily-seen by the rider because unlike wing mirrors, the monitor can be mounted in a position where the rider's body would otherwise block the rear view.

The present invention provides a safer rearview because the rider is not required to physically turn his head toward the rear of the vehicle. In addition, for vehicles that normally employ wing mirrors, the aerodynamics of the vehicle are improved by eliminating the necessity of these mirrors. Side mirrors have been shown to provide a significant drag force.

Figure 1:
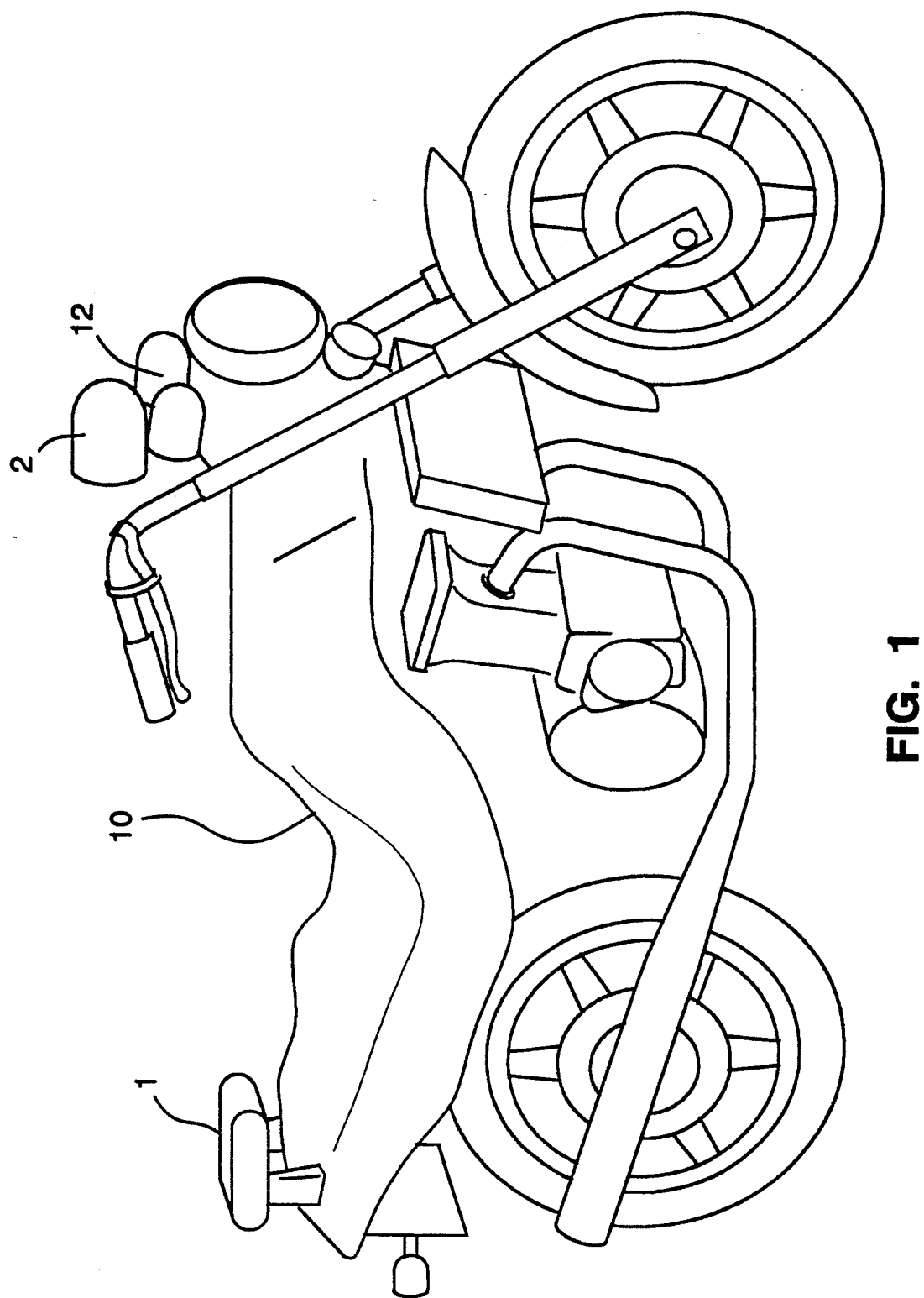
FIG. 1 is a side view of a two-wheeled vehicle with a rear vision system according to the present invention.
Figure 2:
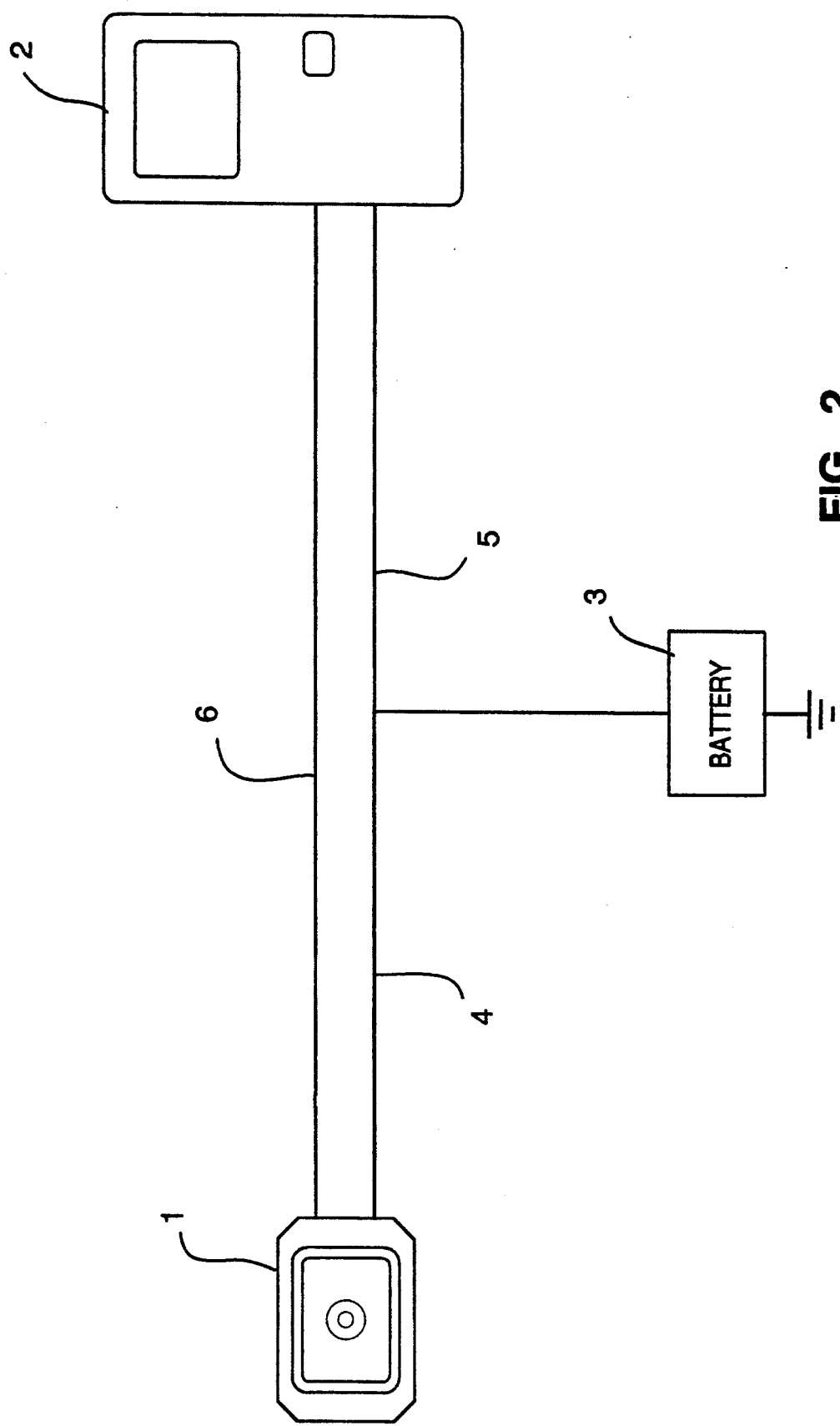
FIG. 2 is a block diagram of a rear-vision system according to the present invention.

Referring to FIGS. 1 and 2, a rear-vision system is shown mounted on a motorcycle 10. The rear-vision system has a camera 1 (such as Sony model HVM-510AM or charge coupled device Sony models SSC-520AM or CCD-G1) mounted behind the rider facing to the rear, a monitor 2 (such as Sony models FDM 330 or FDM-412AM) mounted to the handlebars 12 or frame of the motorcycle in front of the rider, and a power supply 3. An image produced by the camera 1 is provided to the monitor 2 by a wire 6 connecting the two. Power is supplied to the camera 1 from the power supply 3 via a conducting wire 4. Power is supplied to the monitor 2 from the power supply 3 via a conducting wire 5.

On a motorcycle, the power supply 3 may be the same 6-volt battery that motorcycles typically have to start the motorcycle. When the rear-vision system is mounted on a bicycle, however, a separate power supply is provided. This power supply would ideally consist of a pack of rechargeable batteries.

The present invention has been described above with respect to a single embodiment, but the foregoing arrangement may include a number of other features. For example, in other embodiments a computing device is incorporated into the video chain, making it possible to detect the velocity and direction of vehicles approaching from behind. A separate visual or audio indicator can be provided to serve as a warning device in such an embodiment. It may also be desirable to reverse the image of the approaching vehicles to provide a logical orientation of the rear view.

In still other embodiments, an image processing capability, as is currently used in miniature camcorders, provides a stable image under conditions of high vibration. A more stable image may also be provided by mounting the camera and/or monitor on a shock absorbing mount.

In still further embodiments, the imaging device 1 is sensitive to infra-red so that an image can be seen on the monitor in conditions of low visibility caused by fog, snow, rain, or nightfall.

In another modification, the viewing device has the capability of projecting the rear image onto a transparent screen in front of the rider. This is particularly useful for vehicles that use a fairing and windscreen. The type of image seen by the rider in this embodiment is sometimes referred to as a "head up" display.

Although the present invention has been shown and described with respect to preferred embodiments, various changes and modifications which are obvious to a person skilled in the art to which the invention pertains are deemed to lie within the spirit and scope of the invention as claimed.

I claim:

1. A rear-vision system for providing a rider of a two-wheeled vehicle having a frame and moveable handlebars, with a stable image of the complete rear-view from the two-wheeled vehicle, said rear-vision system comprising:
   a) a power supply;
   b) a television camera mounted behind the rider on the two-wheeled vehicle facing to the rear of the two-wheeled vehicle;
   c) a display, connected to the television camera for displaying a television image, and mounted on the vehicle at a point in front of the rider; and
   d) means for connecting the power supply to the display and the camera.

2. A rear-vision system as claimed in claim 1, wherein the television camera is a charge coupled device television camera.

3. A rear-vision system as claimed in claim 1, wherein the display is of the flat display picture tube type.

4. A rear-vision system as claimed in claim 1, wherein the television camera is infra-red sensitive.

5. A rear-vision system as claimed in claim 1, wherein the display comprises a means for projecting the rear-view image into the rider's line of sight.

6. A rear-vision system as claimed in claim 1 wherein the display is mounted on the handlebars.

7. A rear-vision system as claimed in claim 1 wherein the display is mounted on the frame.

* * * * *

UNITED STATES PATENT AND TRADEMARK OFFICE
CERTIFICATE OF CORRECTION

PATENT NO. : 5,243,417

DATED : September 7, 1993

INVENTOR(S): Christopher A. Pollard

It is certified that error appears in the above - identified patent and that said Letters Patent is hereby corrected as shown below:

On the title page, Item
[73] Assignee, change "Sony Corporation, Tokyo, Japan" to --Sony Electronics Inc., Park Ridge, New Jersey--.

Signed and Sealed this

Fifth Day of July, 1994

Attest:

BRUCE LEHMAN

*Attesting Officer*  *Commissioner of Patents and Trademarks*